United States Patent [19]
Siladke et al.

[11] Patent Number: 5,491,875
[45] Date of Patent: Feb. 20, 1996

[54] EXTENDED CAB PICKUP TRUCK CONCEALED CARGO DOOR HINGE

[75] Inventors: E. Robert Siladke, Sterling Heights; Kevin D. Lapham, Royal Oak; Martin A. Belz, Warren, all of Mich.

[73] Assignee: General Motors Corporation, Detroit, Mich.

[21] Appl. No.: 279,142

[22] Filed: Jul. 22, 1994

[51] Int. Cl.[6] .............................. E05D 3/08; E05D 11/10
[52] U.S. Cl. ................................ 16/346; 16/368
[58] Field of Search ............................ 16/282, 288, 302, 16/343, 346, 368–371, 375, 297

[56] References Cited

U.S. PATENT DOCUMENTS

| | | | |
|---|---|---|---|
| 575,961 | 1/1897 | Kipp | 16/370 |
| 1,578,570 | 3/1926 | Anderson . | |
| 2,008,256 | 7/1935 | Lefevre | 16/370 |
| 2,039,130 | 4/1936 | Van Note | 16/278 |
| 3,605,173 | 9/1971 | Lautenschlager, Jr. . | |
| 3,968,540 | 7/1976 | Lautenschlager et al. . | |
| 4,502,182 | 3/1985 | Lautenschlager et al. | 16/288 |
| 4,771,508 | 9/1988 | Lautenschlager, Jr. | 16/370 |
| 4,873,743 | 10/1989 | Toyama | 16/237 |
| 4,884,316 | 12/1989 | Masuda | 16/288 |
| 4,894,884 | 1/1990 | Lautenschlager, Jr. | 16/278 |

FOREIGN PATENT DOCUMENTS 665449  9/1938  Germany .

Primary Examiner—Timothy V. Eley
Assistant Examiner—Kenneth J. Hansen
Attorney, Agent, or Firm—Ernest E. Helms

[57] ABSTRACT

A vehicle door hinge is described. The hinge includes a first weight-supporting link having a first end generally away from a base and a second end generally more adjacent to the base, the first and second ends being on a same side of the base as the first end; a second weight-supporting link with first and second ends, the first end being pivotally connected to the first link first end; a third link with first and second ends, the first end being pivotally connected with the first link second end; a weight-supporting fourth link having a first end and a second extreme end, the first end being connected to the door, the second end being pivotally connected to the second end of the third link, and the fourth link at a portion intermediate the first and second ends being pivotally connected to the second end of the second link; and a spring stop mounted on a side of the second link limiting the opening of the door away from the pillar, the stop also detenting the second ends of the third and fourth links to retain the door in an open position.

4 Claims, 3 Drawing Sheets

5,491,875

1

EXTENDED CAB PICKUP TRUCK CONCEALED CARGO DOOR HINGE

FIELD OF THE INVENTION

The field of the present invention is that of automotive door hinges. More particularly, the field of the present invention is that of concealed automotive door hinges suitable for utilization for a cargo door in an extended cab pickup vehicle.

BACKGROUND OF THE INVENTION

It is well known in the automotive industry to have a pickup truck with an extended cab. An extended cab in a pickup truck allows for the placement of a small bench seat for children or for storage placement inside the vehicle. The overwhelming majority of extended cab vehicles have only driver side and passenger side vehicle doors. In smaller pickup trucks, the area behind the seating is not large enough for a small bench seat but is merely provided for cargo space. However, even in these circumstances, a rear cargo door, at least on the driver side, would be highly desirable to give greater ease of access to the storage space. This access to the storage space is even more desirable for physically challenged individuals since it is often difficult, if not impossible, to place a folded wheelchair into the storage space when the truck only has a conventional front door.

There are three major options in providing a rear cargo door. First, the cargo door may be a sliding door as typically utilized in van vehicles. The sliding door concept is not desirable since it typically requires a longitudinal slot for a middle hinge on the door to extend along the side of the bed of the pickup truck. Additionally, it is almost always desirable to have a small gap between the bed of the pickup truck and the cab for structural reasons. A second option is to have the rear cargo door pivot off a B-pillar and pivot in an angular orientation opposite the pivotal opening of the front door, thereby eliminating any pillar between the front and rear doors. If a conventional hinge is utilized, the hinge must be external to the side of the vehicle. External hinges are less desirable due to aerodynamic reasons and appearance reasons, and also outside exposure exposes them to the elements and dirt. However, an exterior hinge is highly desirable in the case of pickup trucks since another design consideration is to minimize the gap between the cab and the front end of the pickup bed to eliminate interference when opening the door.

To make a truly world class vehicle, a third option should be selected. In the third option, the hinge will be concealed and the rear door should be as close to the pickup bed as possible.

SUMMARY OF THE INVENTION

To meet the aforementioned needs, the present invention is brought forth. This invention provides a four-bar linkage which allows the rear door to have a small gap with the pickup bed yet open outwardly. Additionally, the present invention provides a four-bar linkage which eliminates the weight associated with a normal detent and stop mechanism by making the stop integral with the weight-bearing portion of the link and also provides a spring stop on one of the links to retain the door in the open position. The present invention also provides a four-bar linkage stronger than those previously provided by providing a four-bar linkage wherein all the pivot points are within the planes of the hinge connections with the planar surfaces of the door and of the B-pillar.

2

Other advantages of the present invention will be more apparent as the present invention is explained further in the accompanying drawings and detailed description.

DESCRIPTION OF THE PREFERRED EMBODIMENT

Figure 1:
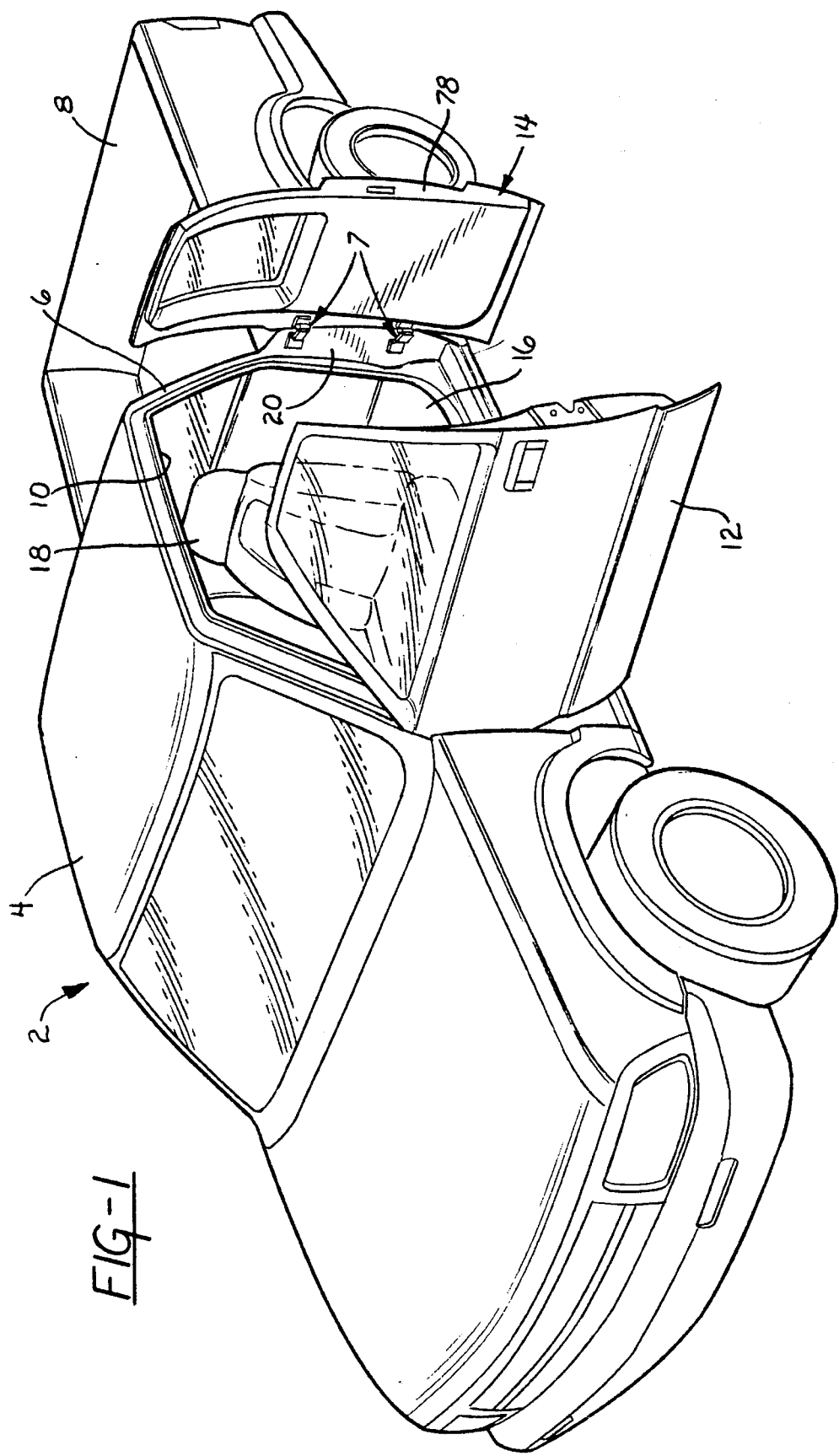
FIG. 1 is a perspective view of an extended cab pickup truck with a rear cargo door utilizing an inventive hinge of a preferred embodiment of the present invention.
Figure 2:
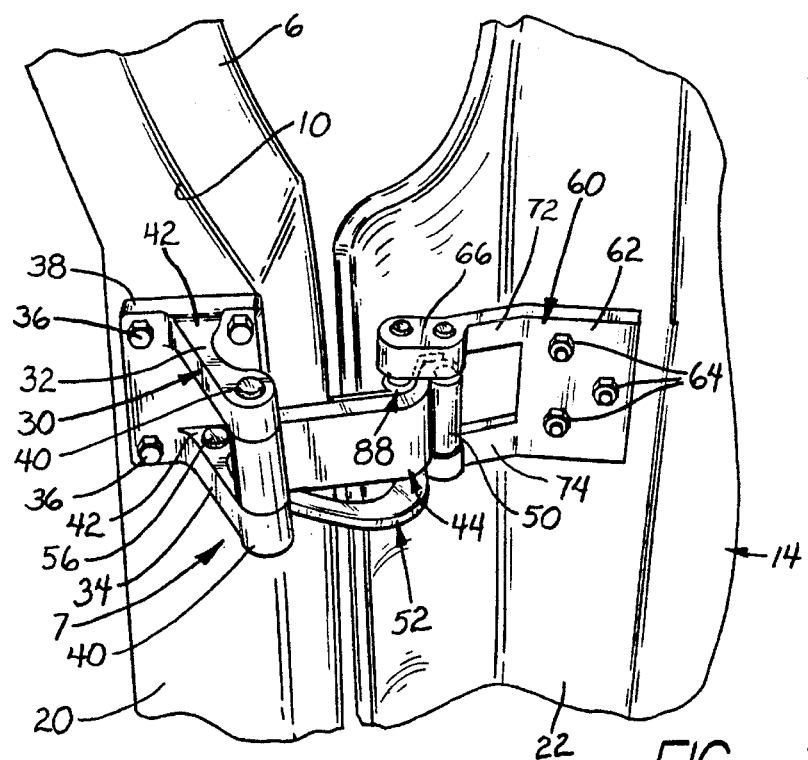
FIG. 2 is an enlarged perspective view of the top hinge shown in FIG. 1.

Referring to FIGS. 1 through 4, an extended cab pickup truck 2 of the present invention has a cab body 4 with a B-pillar 6 and a truck bed 8. The cab has a side opening 10 which is enclosed by a front passenger door 12 and a rear cargo door 14. Connecting the rear cargo door 14 with the B-pillar 6 is an upper and lower hinge 7. The opening of door 14 allows access to the cargo space 16 behind the vehicle seat 18. The B-pillar 6 has a first planar surface 20 almost perpendicular to the fore and aft direction of the vehicle. The door 14 has a second planar surface 22. The door 14 has an outer panel 24 terminating in a bend 26 which has a slight gap 28 between itself and the truck bed 8.

The hinge 7 has a first link 30. The first link 30 has an upper member 32 and a lower member 34 parallel spaced therefrom. Parallel members 32 and 34 are joined to a base 38. By a series of bolts 36, the base 38 is joined to the first planar surface 20 of the B-pillar 6. The first link upper and lower members 32, 34 also have a generally extreme first end 40 and a second end 42 more adjacent to the base 38. The first end 40 and the second end 42 are on the same side of the base 38, allowing the base to be strong and uninterrupted. The first link 30 is a weight-supporting link.

A second link 44 has a first end 46 pivotally connected to the first end 40 of the first link by a pin 48. The second link 44 also has a second end 50.

A third link 52 has a first end 54 pivotally connected to the second end 42 of the first link by a pin 56. The third link 52 also has a second end 58.

A fourth link 60 is connected to the door 14. The fourth link 60 has a first end 62 connected by bolts 64 to the second planar surface 22 of the door. The second end 66 of the fourth link is pivotally connected by a pin 68 to the second end 58 of the third link. Intermediate the first end 62 and the second end 66, the fourth link 60 is pivotally connected by a pin 70 to the second end 50 of the second link. The fourth link 60 is weight bearing and has an upper member 72 and a lower parallel-spaced member 74.

Figures 4, 5:
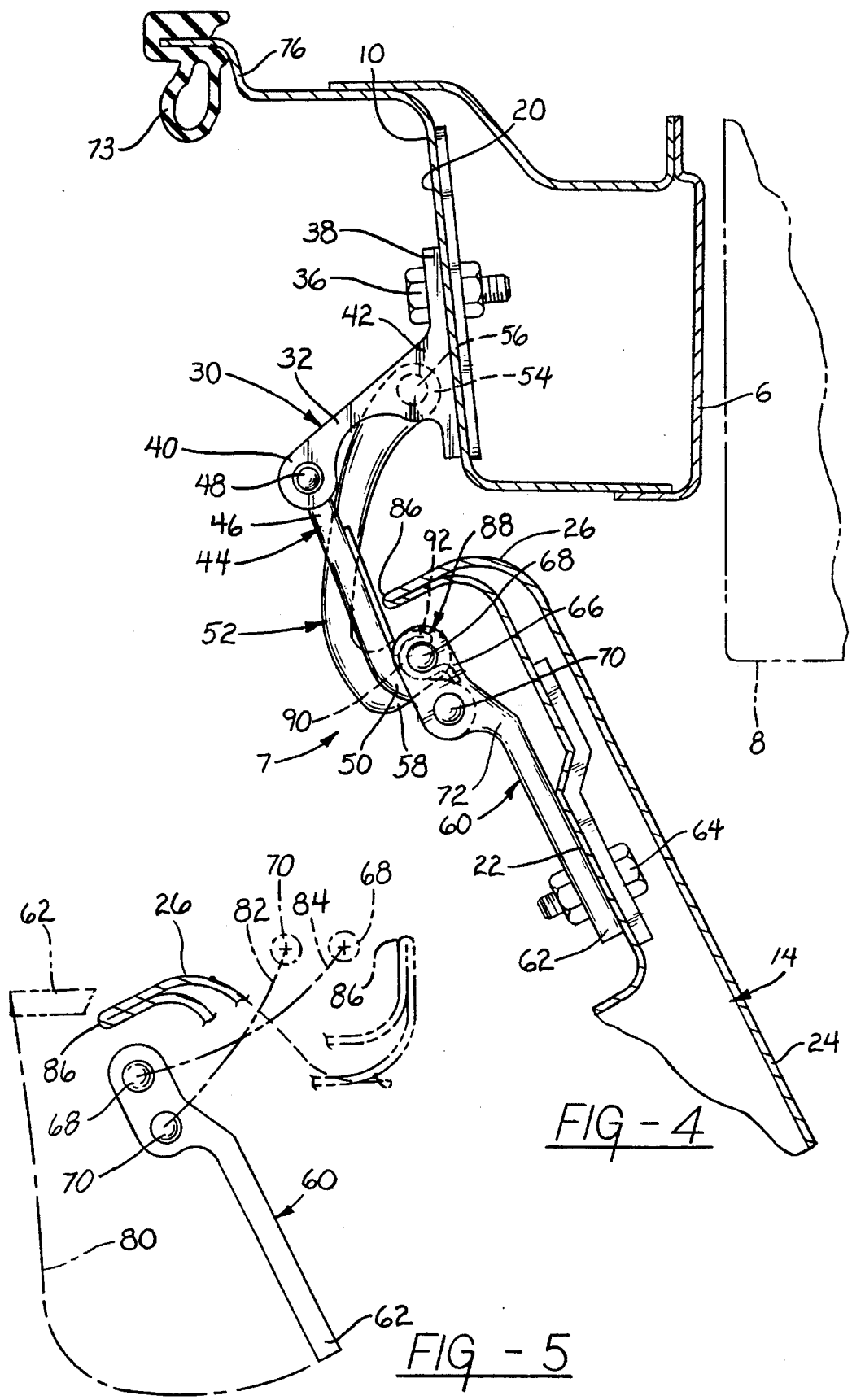
FIG. 5 is a (projection of the trajectory of portions of the door and the hinge shown in FIGS. 1 through 4 while opening the door.

In its normally closed position, the door is sealed by an O-ring 73 extending from a flange 76 of the B-pillar 6. Referring additionally to FIG. 5, an extreme end 78 of the door 14 away from the hinge 7 moves along a path 80. The pin 70 moves along a path 82, which crisscrosses the path 84 taken by the pin 68. Therefore, the tip 86 of the door 14 will not contact the truck bed 8, although the gap 28 is fairly small.

Figure 3:
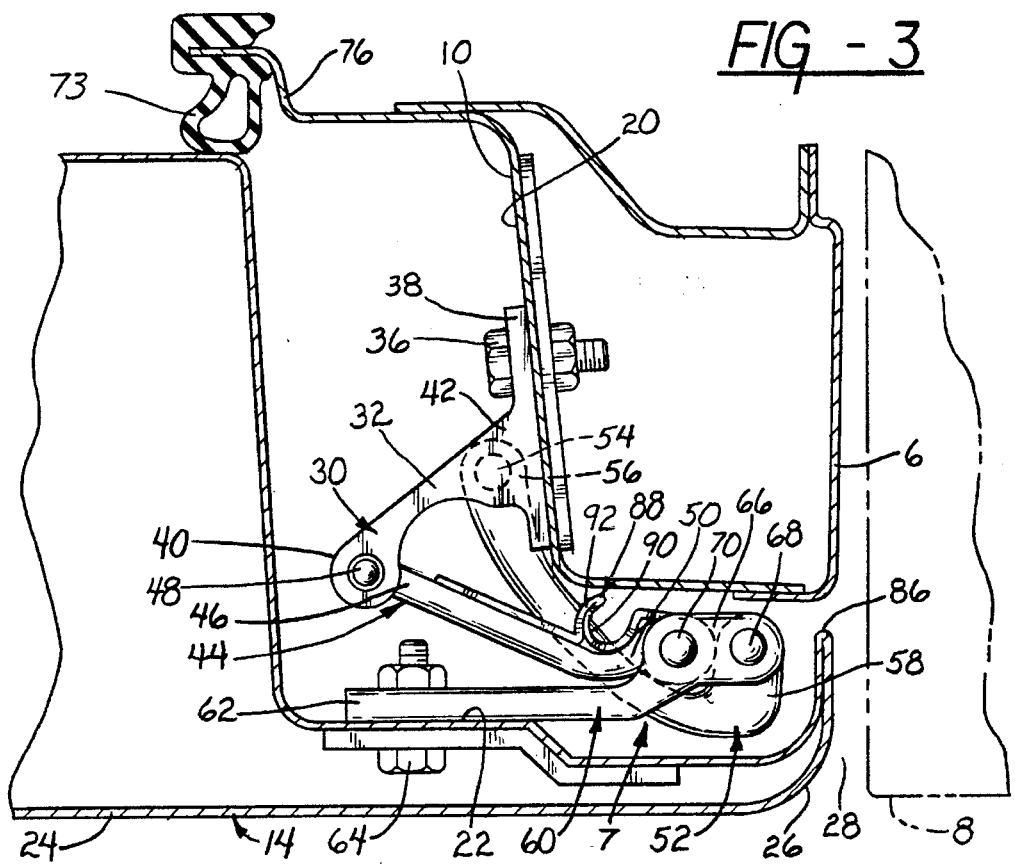
FIGS. 3 and 4 are plane elevational views of the hinge shown in FIG. 2 with FIG. 3 showing the hinge with the door in the closed position and FIG. 4 showing the door in its fully open position.

Referring primarily to FIGS. 3 and 4, on a side of the second weight-bearing link 44 away from the second planar surface 22, there is a stop and spring 88. The stop 88 has a section 90 which limits the outward travel of the door by contact with the pin 68. Upon entry of the pin 68 into the stop section 90, the spring clasp or detent 92 will grab the pin 68, thereby holding the door in the open position. Therefore, in a situation where a physically challenged occupant attempts to remove a wheelchair from the cargo area 16 of the vehicle, the door 14 will remain open without further effort. It is important to note that this detent feature is provided without requiring an additional link and provides a cost and weight savings over previous detent mechanisms. All the weight of the door 14 is carried by the fourth link 60, the second link 44 and the first link 30. Therefore, the third link 52 may be a relatively small member which only functions to control the pivoting of the links as the door 14 is being opened.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A concealed door hinge for a motor vehicle, the motor vehicle having a door opening including a pillar with a first planar surface and a door covering the opening, the door having a second planar surface, the hinge comprising:

a first weight-supporting link affixed to a base joined to the pillar first planar surface, the first link having a first end generally away from the base and a second end generally more adjacent to the base, the first and second ends being on a same side of the base as the first end;

a second weight-supporting link with first and second ends, the second link first end being pivotally connected to the first end of the first link;

a third link with first and second ends, the first end being pivotally connected with the first link second end;

a weight-supporting fourth link, the fourth link having a first end and a second extreme end, the first end being connected to the door second planar surface, the fourth link second end being pivotally connected to the second end of the third link, and the fourth link at a portion intermediate the first and second ends being pivotally connected to the second end of the second link, and the pivotal connection of the fourth link with the second and third links being on a same side of the second planar surface; and a spring stop mounted on a side of the second link farthest away from the door second planar surface limiting the opening of the door second planar surface away from the pillar first planar surface, the stop also detenting the second ends of the third and fourth links by grabbing and holding the third and fourth link second ends to retain the door in an open position.

2. A hinge as described in claim 1 wherein the first link has upper and lower members and the second link is juxtaposed therebetween.

3. A linkage as described in claim 1 which is utilized for a rear cargo door for a truck.

4. A hinge as described in claim 1 wherein the fourth link has upper and lower members connected by a pin therebetween and wherein the pin also is connected to the third link second end and engages the spring stop upon opening of the door.

* * * * *